United States Patent [19]
Slegt

[11] Patent Number: 6,118,102
[45] Date of Patent: Sep. 12, 2000

[54] IMMERSION HEATING ELEMENT SANDWICHED BETWEEN TWO SUBSTRATES

[75] Inventor: Sander Slegt, Leek, Netherlands

[73] Assignee: U.S. Philips Corporation, New York, N.Y.

[21] Appl. No.: 09/203,639

[22] Filed: Dec. 1, 1998

[30] Foreign Application Priority Data

Dec. 5, 1997 [EP] European Pat. Off. .............. 97309809

[51] Int. Cl.[7] ................................................... F27D 11/00
[52] U.S. Cl. ......................... 219/438; 219/540; 219/548; 219/523
[58] Field of Search .................................. 219/438, 436, 219/437, 540, 523, 543, 544, 548

[56] References Cited

U.S. PATENT DOCUMENTS

| | | | |
|---|---|---|---|
| 2,478,499 | 8/1949 | Osterheld | 219/39 |
| 4,827,108 | 5/1989 | Balderson | 219/543 |
| 5,502,293 | 3/1996 | Ohnishi et al. | 219/543 |
| 5,693,244 | 12/1997 | Pragt et al. | 214/441 |
| 5,804,791 | 9/1998 | Gelus | 219/245 |

FOREIGN PATENT DOCUMENTS

| | | | |
|---|---|---|---|
| 2153190 | 8/1985 | United Kingdom | H05B 3/80 |
| 94/18807 | 8/1994 | WIPO | H05B 3/82 |

*Primary Examiner*—Teresa Walberg
*Assistant Examiner*—Shawntina T. Fuqua
*Attorney, Agent, or Firm*—Ernestine C. Bartlett

[57] ABSTRACT

An immersion heating element comprises first and second heat conducting substrates defining top and bottom surfaces of the heating element. An electrically insulating layer is provided on one side of each substrate, and the two substrates are mounted together with the insulating layers facing each other and with a resistive heating track sandwiched between the insulating layers. This structure avoids the need for a thick protective insulating layer over the heating track.

14 Claims, 1 Drawing Sheet

IMMERSION HEATING ELEMENT SANDWICHED BETWEEN TWO SUBSTRATES

BACKGROUND OF THE INVENTION

This invention relates to immersion heating elements, for use in liquid heating vessels such as electric kettles, deep fat fryers, coffee makers and the like. In particular, the invention concerns heating elements which provide heating using thick film heating tracks.

The use of thick film heating elements is increasing in hot water applications such as kettles and coffee makers. Conventionally, a thick film heating element defines the base of the vessel for the liquid to be heated. The heating element itself comprises a metal substrate on one side of which there is provided an insulating layer, and a printed circuit heating track is provided over the insulating layer. When the heating element is mounted in the vessel, the side of the substrate opposite the heating track defines the base of the vessel, so that the heating track and insulating layer are disposed outside the vessel and thereby do not make contact with the liquid to be heated. The use of thick film heating tracks enables the power of the heating element to be increased, and the additional advantage is provided that cleaning the inside of the vessel is easier, when compared with vessels using conventional sheathed immersion heating elements. A flat heating element also provides improved appearance of the inside of the liquid heating vessel.

There have also been proposals to manufacture a thick film immersion heating element. For example, International Patent Publication No. WO94/18807 discloses an immersion heating element comprising a thick film resistive heating track which is deposited between insulating layers and provided on a stainless steel support plate. The heating track must be covered by an insulating layer because, for an immersion heater, both sides of the heating element are in contact with the liquid to be heated. The top insulating layer must also function as a mechanical protection layer, and therefore requires sufficient thickness to resist incidental damage (for example during cleaning).

For a conventional thick film heating element, which defines a portion of the vessel for the liquid to be heated, the insulating layer is fired at a first temperature on the metal substrate, and the thick film heating track is deposited over the insulating layer and fired at a second, lower temperature. Consequently, the firing stage for the heating track does not damage the insulating layer beneath, since it can withstand much higher temperatures, and has a higher firing temperature itself. The problem therefore arises if an attempt is made to provide an additional insulating layer over the heating track, as suggested in WO 94/18807, that the firing required to bond the second insulating layer over the heating track may damage the heating track itself, for example changing the resistance of the heating track, if similar insulating layers are selected.

SUMMARY OF THE INVENTION

According to the present invention there is provided an immersion heating element comprising first and second heat conducting substrates defining top and bottom surfaces of the heating element, an electrically insulating layer being provided on one side of each substrate, the two substrates being mounted together with the insulating layers facing each other and with a resistive heating track sandwiched between the insulating layers.

Since the immersion element of the invention comprises two substrates each with its own associated insulating layer, both insulating layers may be fired at the desired high temperatures before sandwiching the heating track between the two substrates.

The insulating layers preferably comprise an enamel layer, which has a firing temperature greater than 750° C., and typically in the region of 900° C. The heating track preferably comprises a silver palladium track, which typically has a firing temperature of between 600 and 750° C. although temperatures as high as 850° C. may be appropriate depending upon the selected composition.

The immersion element may be provided with passageways extending through the element, for improving the flow of liquid from beneath the heating element to above the element. This improves the heating of the liquid through convection and also reduces the likelihood of vapor pockets being formed beneath the heating element and which can reduce the thermal heat transfer to the liquid being heated.

The invention also provides an electric kettle incorporating an immersion element of the invention.

In addition, the invention provides a method of manufacturing an immersion heating element comprising the steps of:

providing first and second heat conducting substrates;

depositing an electrically insulating layer over one side of the first and second substrates, and firing each insulating layer at a first firing temperature;

depositing a thick film electrically conductive heating track over the insulating layer of one of the substrates, and firing the heating track at a second firing temperature less than or equal to the first firing temperature;

mounting the first and second substrates together with the insulating layers facing each other.

According to the method of the invention, the insulating layers are provided over separate substrates and can be deposited and fired without any effect on the heating track, which is subsequently applied to one of the substrates.

The step of mounting the substrates together preferably comprises applying a bonding agent over the insulating layer of one of the substrates, pressing the substrates together and firing the heating element at a third firing temperature less than the second firing temperature, for curing the bonding agent. The bonding agent may comprise a lead glass composition, which may typically have a firing temperature of approximately 500° C.

BRIEF DESCRIPTION OF THE DRAWINGS

The invention will now be described by way of example with reference to, and as shown in, the accompanying drawings in which.

In the following description, the heating element of the invention has been described in connection with an electric kettle. It should be understood, however, that a heating element of the invention can be applied to any existing liquid heating vessel using an immersion heating element or to applications where it is conventional to use a heating element which defines a portion of the heating chamber. In the figures, the thicknesses of the layers constituting the heating element have been exaggerated for the purposes of clarity.

DESCRIPTION OF THE PREFERRED EMBODIMENTS

Figure 1:
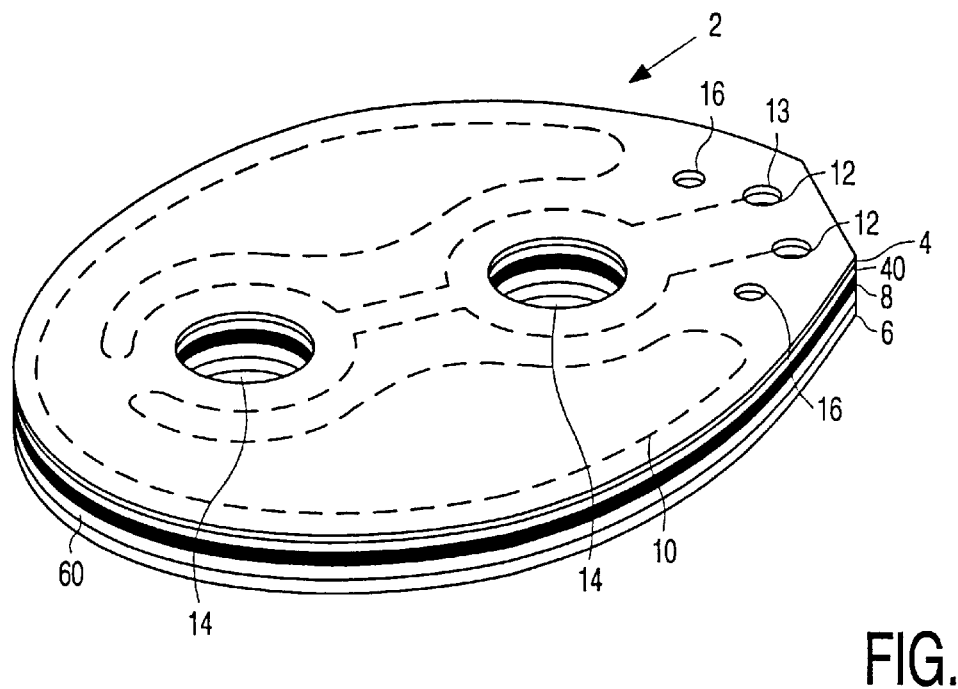
FIG. 1 shows a heating element of the invention.

FIG. 1 shows a heating element according to the invention. The heating element 2 comprises first and second stainless steel substrates 4, 6 which define opposite faces of the heating element 2. Each substrate 4, 6 is provided on one face with a respective insulating layer 40, 60. The two substrates, with their associated insulating layers, are mounted together with the insulating layers 40, 60 facing each other. An intermediate layer 8 is sandwiched between the two substrates 4, 6 and contains the electrically resistive heating track 10, represented by the dotted line in FIG. 1. The heating track comprises a path extending between two contact terminals 12.

To enable electrical connection to the contact terminals 12, one of the substrates (substrate 4 in FIG. 1) is provided with openings 13 extending through the substrate 4 and the associated insulating layer 40.

As the heating element of the invention has two separate substrates, each provided with its own respective insulating layer, the insulating layers can be deposited on the respective substrate independently of the formation of the heating track, so that the high temperature firing process required for the preferred insulating layers (as will be described in the following) does not damage the material of the heating track.

The element shown in FIG. 1 is also provided with optional convection passageways 14 which promote the passage of liquid from one side of the heating element to the other side. The heating element also has mounting means, in the form of bolt holes 16 in the element shown in FIG. 1.

The processes involved in the manufacture of the heating element shown in FIG. 1 will now be described.

Each substrate 4, 6 comprises a plate of heat conductive material, such as stainless steel, which is preferred for its anti-corrosion benefits. The substrate is formed as a generally planar sheet of metal and may have any suitable shape. Each substrate 4, 6 may have a thickness of approximately 1 mm which gives the heating element sufficient rigidity while still allowing transfer of heat through each substrate to the liquid being heated. One of the two substrates is provided with openings 13 (as described above) to enable connection to the heating element track to be sandwiched between the substrates. These openings 13 may be provided in the substrate before or after the application of the insulating layer.

The insulating layer 40, 60 applied to each substrate may, for example, comprise a glass ceramic coating material. This may be applied by screen printing of powdered glass ceramic material to the substrate, and causing the material to crystallise by applying heat, thereby heating the substrate to the firing temperature of the insulator layer. Typically, the insulating layer has a thickness of the order of 50–250 $\mu$m and the firing temperature of a suitable glass ceramic material having a low thermal resistance is above 750° C., and typically of the order of 900° C.

A large number of glass ceramic compositions are known to those skilled in the art, and the choice of ceramic material for use as the insulating layer depends upon the desired characteristics of the layer, such as the dielectric constant, the breakdown voltage, the leakage current, the electrical resistance, the thermal conductivity, the layer thickness and the thermal heat capacity.

An alternative to the use of a glass ceramic dielectric insulating layer is the use of a porcelain enamelled substrate. The enamelling process involves fusing a vitreous glass glaze on the metallic substrate by dipping, spraying or printing the substrate, and again firing the coated substrate so that the enamel fuses to form a glass coating. Adherence of the enamel to the steel is improved by grit blasting the substrate before enamelling. Again, typical firing temperatures required to form the glass coating are in excess of 750° C.

Once the insulating layers have been formed on each substrate, the heating track 10 is formed on the insulating layer of one of the substrates using a thick film technique. As described above, the heating track comprises a resistance path connected between two terminals, and may be in any suitable shape. Although a single path is shown in FIG. 1, the heating track may comprise a number of parallel branches, and electric controls may also be provided on the substrate, such as thick film thermistors for temperature regulation. The heating track 10 comprises, for example, a screen-printed paste which is fired to bond the track to the insulating layer 60. The material of the resistive track paste is selected to have a firing temperature below that of the insulating layer on which the track is deposited, so that the firing of the track does not damage the insulating layer beneath. The thick film track material will be selected depending upon, for example, the resistivity and temperature coefficient of resistance required. Silver palladium or nickel-based (precious metals) tracks are conventional in the art, and have firing temperatures below or similar to that of the glass ceramic or porcelain enamel insulating layer. Silver palladium is a preferred heating track material, having a firing temperature of approximately of 650 20 C. The heating track may typically have a thickness of 10 $\mu$m.

The materials and processing described above for forming a thermal heating track on a substrate over an insulating layer are conventional in the art.

In accordance with the invention, the heating track is provided on one of the two substrates and the two substrates are then joined together to sandwich the heating track between the insulating layers. The preferred method employs a bonding agent which is applied to one of the two substrates before pressing the two substrates together. The bonding agent comprises an electrically insulating layer, for example another ceramic or enamel layer. However, the firing temperature is required to be below that of the heating track so that the firing of the bonding agent does not damage the heating tracks. One preferred bonding agent is a lead-glass composition which may have a firing temperature of approximately 500° C. In the method of the invention, since the low temperature insulating layer is sandwiched between the two substrates, the low temperature insulating layer does not need to provide mechanical protection and therefore the thickness of the layer is dictated only by the desire to provide adequate bonding and to fill the spaces between the heating track paths. For example, a thickness of lead-glass of the order of 20 $\mu$m may be used. The lead glass paste may be screen printed or sprayed onto one of the two substrates, and the two substrates are then pressed firmly together until all air pockets are expelled from the spacing between the substrates. This process may be carried out at a reduced air pressure to promote the expulsion of air pockets. The subsequent low temperature firing process also promotes the expulsion of air from the layer.

The heating element 2 is provided with passageways 14 extending completely through the element. These passageways encourage the free convection of liquid between regions above and below the heating element. This may provide a particular advantage for liquids of greater viscosity, for example oil used in deep fat fryers. Any suitable arrangement of passageways 14 may be selected, and although two passageways are shown in FIG. 1, a single centrally located opening may alternatively be employed.

The shape of the heating element will obviously be selected with the shape of the vessel in mind, but some clearance should be provided around the edge of the element to allow for creepage during heating. However, even with the clearance around the heating element, cleaning of the interior of the vessel and the heater (which may optionally be removable and suitable for cleaning in a dishwasher) is much easier when compared with conventional sheathed heating elements, whereas the thermal transfer characteristics are improved when compared with conventional thick film heating elements which define a portion of the wall of the vessel.

As described above, openings 13 are provided to enable connection to the contact terminals 12 of the thick film heating track 10. For this purpose, spring contacts, soldering, conductive adhesives or sintered SMD contacts may be employed. The electrical contacts need to be sealed by an appropriate technique, for example the area of the substrate in which the openings 13 are provided may be mounted against a portion of the wall of the vessel chamber. This technique is employed in the electric kettle shown in FIG. 2 and described below.

Figure 2:
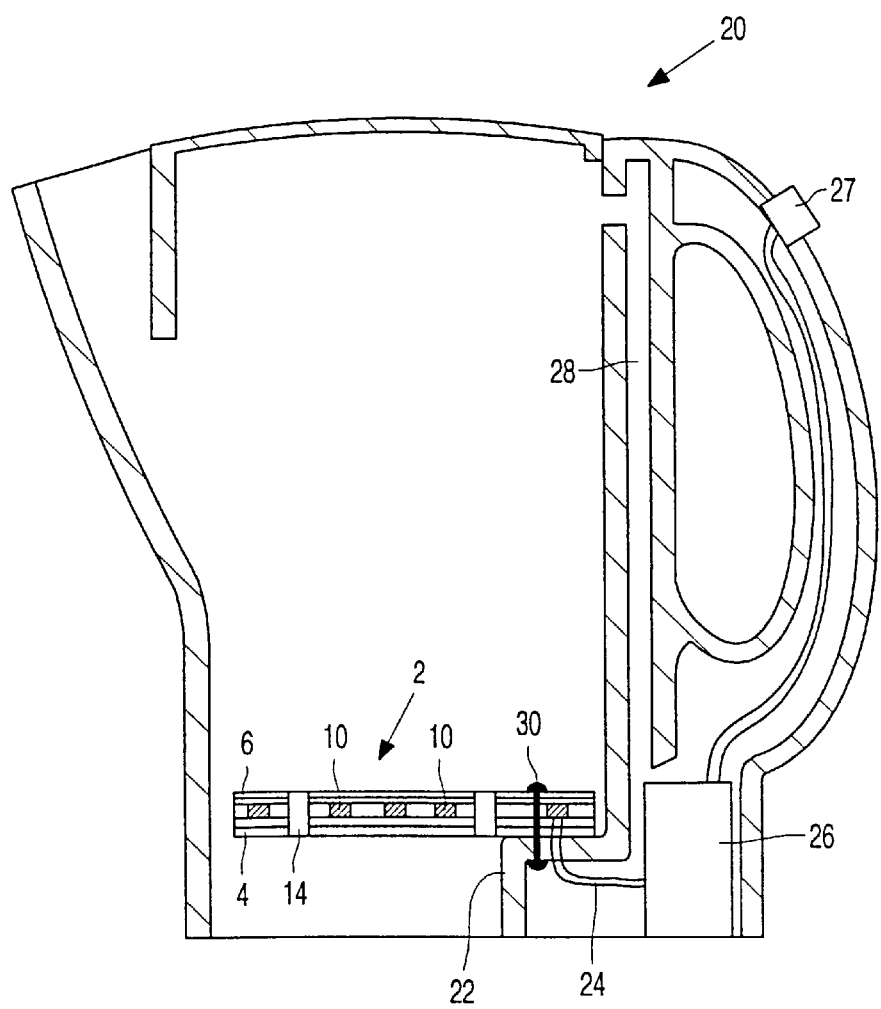
FIG. 2 shows an electric kettle incorporating an immersion heating element according to the invention.

The heating element 2 is supported in the base of the kettle 20 on a stepped portion 22 of the base of the kettle. The stepped portion 22 provides a face against which one of the substrates 4 rests, and terminal connections 24 (one of which is shown in FIG. 2) pass through the step 22. The terminal connections 24 are coupled to a control unit 26 which also receives signals from an on/off switch 27. The control unit 26 also has a steam sensitive switch located at the base of a steam chamber 28 which conducts steam from the interior of the kettle 20 when boiling occurs. The control unit 26 may comprise a cordless connector, and various additional control functions may be implemented by the control unit 26. These will not, however be described in this text. The heating element 2 is secured to the stepped portion using bolts 30 passing through the bolt holes 16. There, are of course, many alternative ways of securing the heating element in the base of the kettle.

The heating element may be secured in such a way that the element can be removed by the user to enable more effective cleaning of the element and of the heating vessel.

What is claimed is:

1. An immersion heating element comprising first and second heat conducting substrates defining top and bottom surfaces of the heating element, an electrically insulating layer provided on one side of each substrate, and a resistive thick film heating track formed on one of the insulating layers from deposited and fired material, wherein the two substrates are so mounted together that the insulating layers are facing each other and the resistive thick film heating track is sandwiched between the insulating layers.

2. An immersion heating element as claimed in claim 1, wherein each insulating layer comprises an enamel layer.

3. An immersion heating element as claimed in claim 1, wherein the heating track comprises a silver palladium track.

4. An immersion heating element as claimed in claim 1, wherein at least one passageway is provided extending through the element.

5. An electric kettle incorporating an immersion element as claimed in claim 1.

6. A method of manufacturing an immersion heating element, comprising the steps of:

providing first and second heat conducting substrates;

depositing an electrically insulating layer over one side of the first and second substrates, and firing each insulating layer at a first firing temperature;

depositing a thick film electrically conductive heating track over the insulating layer of one of the substrates, and firing the heating track at a second firing temperature less than or equal to the first firing temperature;

mounting the first and second substrates together with the insulating layers facing each other with said resistive heating track sandwiched between the insulating layers.

7. A method as claimed in claim 6, wherein the step of mounting the substrates together comprises applying a bonding agent over the insulating layer of one of the substrates, pressing the substrates together and firing the heating element at a third firing temperature less than the second firing temperature, for curing the bonding agent.

8. A method as claimed in claim 7, wherein the bonding agent comprises lead-glass.

9. A method as claimed in claim 7, wherein the electrically insulating layer comprises an enamel layer, and the first firing temperature is greater than 750 degrees celsius.

10. A method as claimed in claim 9, wherein the thick film conductive heating track comprises a silver palladium layer, and the second firing temperature lies between 600 and 750 degrees celsius.

11. An immersion heating element comprising first and second heat conducting steel substrates defining top and bottom surfaces of the heating element, an electrically insulating layer of glass ceramic coating material or porcelain enamel provided on one side of each substrate, and a resistive thick film silver palladium or nickel-containing heating track formed on one of the insulating layers from deposited and fired material, wherein the two substrates are mounted together with the insulating layers facing each other and with the resistive silver palladium or nickel-containing heating track sandwiched between the insulating layers.

12. An immersion heating element as claimed in claim 11, wherein the heating track is bonded to at least one of the substrates via a lead-glass bonding agent.

13. A method of manufacturing an immersion heating element, comprising the steps of:

providing first and second heat conducting steel substrates;

depositing an electrically insulating layer of glass ceramic coating material or porcelain enamel over one side of the first and second substrates, and firing each insulating layer at a first firing temperature above 750° C.;

depositing a thick film electrically conductive silver palladium or nickel-containing heating track over the insulating layer of one of the substrates, and firing the heating track at a second firing temperature less than or equal to the first firing temperature;

mounting the first and second substrates together with the insulating layers facing each other and said heating track sandwiched between the insulating layers.

14. A method of manufacturing an immersion heating element as claimed in claim 13, wherein the heating track is bonded to at least one of the substrates via a lead-glass bonding agent.

* * * * *